US005592387A

United States Patent [19]

Shelef et al.

[11] Patent Number: 5,592,387

[45] Date of Patent: Jan. 7, 1997

[54] METHOD OF OPERATING A NATURAL GAS VEHICLE AS A FUNCTION OF AMBIENT METHANE CONCENTRATION

[75] Inventors: Mordecai Shelef, Bloomfield Village; Eleftherios M. Logothetis, Birmingham, both of Mich.

[73] Assignee: Ford Motor Company, Dearborn, Mich.

[21] Appl. No.: 267,737

[22] Filed: Jun. 29, 1994

[51] Int. Cl.$^6$ .......................... G06F 19/00; F02B 43/00

[52] U.S. Cl. ................ 364/431.02; 123/527; 123/198 D; 123/198 DC; 123/198 DB; 123/494; 123/680; 123/520; 364/431.01

[58] Field of Search ......................... 364/431.02, 431.01, 364/424.1, 424.01, 425; 123/198 D, 198 DC, 527, 1 A, 3, 525, 526, 704, 494, 630, 198 DB, 520; 62/48.1, 48.3, 50.2, 50.4, 7; 60/285, 276, 278; 340/439, 451, 626; 141/11, 4, 82

[56] References Cited

U.S. PATENT DOCUMENTS

| | | | |
|---|---|---|---|
| 4,971,001 | 11/1990 | Tharman | 123/198 D |
| 5,051,921 | 9/1991 | Paglione | 364/509 |
| 5,107,906 | 4/1992 | Swenson et al. | 141/11 |
| 5,117,802 | 6/1992 | Durbin | 123/577 |
| 5,199,397 | 4/1993 | Shelef et al. | 123/198 D |
| 5,220,897 | 6/1993 | Buchalla et al. | 123/198 D |
| 5,249,561 | 10/1993 | Thompson | 123/520 |
| 5,255,656 | 10/1993 | Rader et al. | 123/494 |
| 5,283,548 | 2/1994 | Kanno | 123/198 D |
| 5,311,851 | 5/1994 | Wright, Jr. | 123/198 DB |
| 5,315,831 | 5/1994 | Goode et al. | 123/527 |
| 5,333,591 | 8/1994 | Korsmeier et al. | 123/527 |
| 5,341,299 | 8/1994 | Stellwagen et al. | 123/527 |
| 5,373,822 | 12/1994 | Thompson | 123/520 |
| 5,400,758 | 3/1995 | Rader et al. | 123/494 |
| 5,409,046 | 4/1995 | Swenson et al. | 141/11 |
| 5,497,753 | 3/1996 | Kopera | 123/494 |
| 5,501,200 | 3/1996 | Bogartz | 123/527 |

*Primary Examiner*—Kevin J. Teska
*Assistant Examiner*—Jacques Louis-Jacques
*Attorney, Agent, or Firm*—Peter Abolins

[57] ABSTRACT

A method of controlling operation of a compressed natural gas vehicle as a function of a predetermined level of methane in the ambient. Vehicle ignition is turned off when a predetermined level of methane is sensed in the ambient.

1 Claim, 1 Drawing Sheet

METHOD OF OPERATING A NATURAL GAS VEHICLE AS A FUNCTION OF AMBIENT METHANE CONCENTRATION

BACKGROUND OF THE INVENTION

1. Field of the Invention

The invention relates to the operation of vehicles fueled by compressed natural gas (CNG).

2. Prior Art

Even though natural gas is in universal use as a household and commercial fuel, the acceptance of compressed natural gas as fuel for motor vehicles, in particular those for personal transportation, has been hampered by its low volumetric energy density as compared with that of the common liquid fuels, gasoline and diesel fuel. This manifests itself in lower power and performance, a more expensive and heavier fuel storage, shorter range, and a larger share of the useful vehicle space occupied by the fuel system as compared to vehicles fueled by liquids. The developments of the last 20 years have largely minimized these drawbacks such that vehicles powered by internal combustion engines designed for natural gas combustion approximate, in their overall performance, those powered by liquid fuels.

In the past there have been instances where in times of extreme scarcity of liquid fuels, local availability of natural gas made it the fuel of choice. An example is the Po valley of Italy in the years after the 2nd World War, 1947–9. There the majority of vehicular traffic was powered by the abundant, locally produced natural gas.

While presently there is no mass production of CNG vehicles, local availability of cheap natural gas results in some low level conversion of vehicles, primarily light trucks, to this fuel. At present the price of liquid hydrocarbons is low and their availability is high so that the market impetus for wider implementation of natural gas is absent. This condition can change in the future and the ample domestic resources of natural gas might be drawn upon for fueling personal transportation vehicles. Also, environmental constraints, both localized as in the Los Angeles Basin and global, as related to the climate change concerns, may promote the use of natural gas for vehicular transport since it presents a practical, large volume, alternative to gasoline and diesel fuel.

Any widespread use of vehicles using a gaseous fuel may lead to various alerting devices located on the vehicle itself as well as in parking garages. These are some of the problems this invention overcomes.

SUMMARY OF THE INVENTION

This invention comprises a system that responds to a predetermined level of methane and controls operation of a CNG vehicle as a function of such level. For example, the ignition of the CNG vehicle may be turned off when such a predetermined level of natural gas is present in the surrounding atmosphere.

BRIEF DESCRIPTION OF THE DRAWINGS

The FIGURE is a block diagram of logic flow of a method of vehicle operation in accordance with an embodiment of this invention.

DETAILED DESCRIPTION OF THE INVENTION

Figure 1:
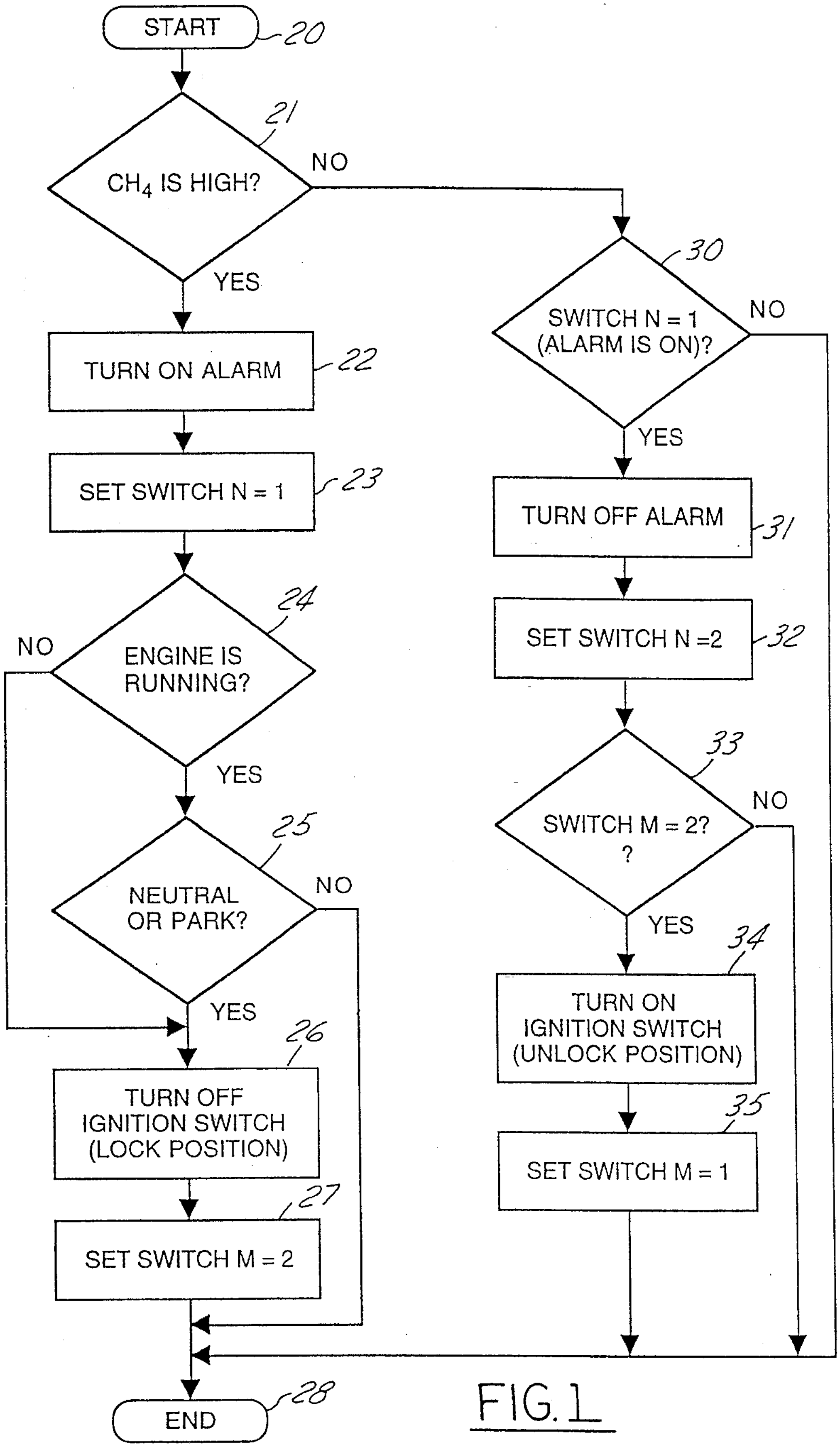

This invention teaches a method of operating a vehicle in response to a predetermined content of methane ($CH_4$) in the surroundings. For example, under certain conditions, the method may include automatically turning off the ignition of a CNG powered vehicle parked in a closed space such as a garage, when a predetermined level of natural gas (methane) is present in this space. The system uses a sensor which can sense and measure the concentration of natural gas in the ambient. Advantageously, the sensor must be selective to methane as not to provide false alarms. Since people store organic, flammable materials in their garages such as gasoline and solvents, it is undesirable to turn on the alarm in response to small concentrations of such organic fumes.

Several types of gas sensors which respond to $CH_4$ exist, for example, the $SnO_2$ sensors produced by Figaro Engineering Inc. and the pellistors produced by, for example, Neotronics of North America, Inc. and others. However, these sensors are not selective, that is, they respond not only to $CH_4$ but even more strongly to gasoline, ethanol, and many other solvents and combustibles. Consequently, if a non-selective sensor is used, the mere presence in the garage of gasoline vapors in small quantities may turn on an alarm and affect vehicle operation even in the absence of $CH_4$ in the ambient.

This invention uses a selective sensor to avoid false alarms. A sensor of this type has been described in U.S. Pat. No. 4,870,025 assigned to Ford Motor Company, the disclosure of which is incorporated herein by reference. It has two electrically connected catalysts, one being a palladium catalyst and the other being a platinum catalyst heated at a temperature of about 350° to 450° C. When the ambient gas atmosphere contains $CH_4$ and other interfering combustibles, the methane and the other combustibles, are oxidized by the palladium catalyst, whereas the second platinum catalyst oxidizes only the other combustibles. Consequently, the palladium catalyst will be heated to a higher temperature than the platinum catalyst. The difference in temperature of the two catalysts provides a measure of the concentration of methane. The sensor response is advantageously matched to the ambient concentration of $CH_4$ i.e., at ca. 2.5 volume % which is ½ of the lower flammability limit.

Referring to the FIGURE, a logic flow diagram shows a sequence of operations in accordance with an embodiment of this invention. Logic flow starts at a start block 20 and then goes to a decision block 21 where it is asked whether the $CH_4$ level is high (e.g. >2.5 volume %). If YES, logic flow goes to a block 22 wherein an alarm is turned on. Logic flow then goes to a block 23 where a switch N is set to "1". Logic flow then goes to a decision block 24 where it is asked whether the vehicle engine is running. If YES, the logic flow goes to a decision block 25 where it is asked whether the vehicle transmission is in neutral or park. If YES, logic goes to a block 26 where the ignition switch is turned off. Logic flow then goes to a block 27, where a switch M is set to "2", and then goes to an END block 28. Returning to decision block 25, if NO, logic flow goes to END block 28. Returning to decision block 24, if NO, logic flow goes to block 26.

Returning to decision block 21, if NO, logic flow goes to a decision block 30 where it is asked whether the switch N has a value of "1" (that is, if the alarm is on). If YES, the logic flow goes to a block 31, where the alarm is turned off, and then goes to a block 32, where the switch N is set to "2". The logic flow then goes to a decision block 33 where it is asked whether the switch M has the value "2" (that is, if the ignition switch is turned off and locked). If YES, the logic flow goes to a block 34, where the ignition switch is turned on (unlocked), then goes to a block 35, where the switch M is set to "1", and finally goes to END block 28. Returning to decision block 33, if NO, the logic block goes to END block 28. Returning to decision block 30, if NO, the logic flow goes to END block 28.

Various modifications and variations will no doubt occur to those skilled in the arts to which this invention pertains. For example, instead of, or in addition to, turning off the ignition switch, an alarm device, such as the horn or lights, can be activated. Such variations which generally rely on the teachings through which this disclosure has advanced the art are properly considered within the scope of this invention.

We claim:

1. A method of operating a compressed natural gas (CNG) vehicle using a computer as a function of a concentration of methane in an atmosphere surrounding the vehicle includes the computer implemented steps:

establishing a predetermined level of methane concentration;

operating the CNG vehicle as a function of that predetermined level by turning off a vehicle ignition of the CNG vehicle when the predetermined level of methane is sensed in the surrounding atmosphere, said establishing and operating steps including the steps of:

determining if the level of methane is higher than the predetermined level using a sensor selectively responsive to methane;

if yes, turning on an alarm and setting a switch N equal to 1;

determining if the engine is running;

if yes, determining if a vehicle transmission is either in the neutral or park condition;

if no, ending the process;

if yes, turning off the ignition switch;

if the engine is not running, turning off the ignition switch;

logic flow then goes to setting a switch M equal to 2 and then ending the logic flow;

if the original methane level was not high, logic flow goes to a decision block to determine if the switch N is equal to 1, indicating the alarm is on;

if no, exiting the logic flow;

if yes, then turning off the alarm, setting the switch N equal to 2;

deciding if a switch M is equal to 2;

if switch M is not 2, exiting the logic flow; and if yes, turning on the ignition switch to the unlock position and setting the switch M equal to 1.

* * * * *